July 12, 1960 C. L. BARTLETT 2,944,342
MEASURING APPARATUS
Filed May 2, 1955 6 Sheets-Sheet 1

Fig.1.

INVENTOR
C. L. BARTLETT
By Wilkinson & Mawhinney
ATTYS.

July 12, 1960

C. L. BARTLETT

2,944,342

MEASURING APPARATUS

Filed May 2, 1955

INVENTOR
C. L. BARTLETT
By Wilkinson & Mawhinney
ATTYS.

July 12, 1960 C. L. BARTLETT 2,944,342
MEASURING APPARATUS
Filed May 2, 1955 6 Sheets-Sheet 5

INVENTOR
C. L. BARTLETT
by Wilkinson & Mawhinney
ATT YS.

July 12, 1960 C. L. BARTLETT 2,944,342
MEASURING APPARATUS

Filed May 2, 1955 6 Sheets-Sheet 6

INVENTOR
C. L. BARTLETT
By Wilkinson & Mawhinney
ATT'YS.

United States Patent Office 2,944,342
Patented July 12, 1960

2,944,342

MEASURING APPARATUS

Christopher Leslie Bartlett, Bristol, England, assignor, by mesne assignments, to Bristol Aero-Engines Limited, Bristol, England, a British company Filed May 2, 1955, Ser. No. 505,143

34 Claims. (Cl. 33—174)

This invention relates to apparatus for checking or measuring a straight series of two or more grooves or serrations which are geometrically similar in shape, which have flanks which converge, at least in part, inwardly towards the bottom of the groove or serration, and in which the pitch between any pair of adjacent grooves or serrations is constant along the length of the grooves or serrations. Such a straight series of grooves or serrations are hereinafter referred to as a straight series of gooves or serrations as defined. It is to be understood that the requirement that the pitch between any pair of adjacent grooves or serrations be constant does not require that the pitch shall be the same between any one pair of grooves or serrations as it is between any other pair of grooves or serrations. By a "straight series" of grooves or serrations is meant a series of grooves or serrations in which the pitch of adjacent grooves or serrations may be measured along a straight line hereinafter termed a reference line of pitch measurement.

Apparatus according to the invention is especially useful for checking or measuring the pitch between the V-shaped serrations on the sides of a so-called "fir-tree" root of a turbine or the like blade, but the invention is in no way limited to this application.

The object of the present invention is to provide simple and reliable apparatus which will enable the pitch of such serrations, as determined from points on their flanks, to be rapidly checked for error or measured to a high degree of accuracy.

To this end the invention broadly provides apparatus comprising a gauging pillar journalled with rotational and axial freedom in a holding member, abutment means separate of the gauging pillar for locating an article having a straight series of two or more grooves or serrations as defined in a reference position with a reference line of pitch measurement of the grooves or serrations parallel to the direction of axial freedom of the gauging pillar, a cam-like projection on the gauging pillar which is fixed in relation to the pillar and which is adapted to engage at least one flank of at least one of the grooves or serrations and means for indicating changes in a dimension extending in the direction of axial freedom of the gauging pillar between a point on the pillar and a point fixed relatively to said abutment means.

Preferably said cam-like projection is of such shape and location relatively to the axis of the pillar that it could, with the axis of the pillar always maintained parallel with, but not fixed with reference to, said reference line of pitch measurement, and without displacing the gauging pillar axially, roll along at least one of the grooves or serrations to be checked or measured while contacting the inwardly converging flanks of the groove or serration intermediately of their depth or roll along at least one of the ridges between an adjacent pair of the grooves or serrations while contacting the inwardly diverging flanks of the ridge intermediately of their height.

Suppose that, in use, when the gauging pillar is turned, the cam-like projection enters a V-shaped serration, in an article located by the abutment means, then the gauging pillar is moved endwise by cam action between the cam-like projection and that flank of the serration which it first encounters, such endwise movement ceasing when the cam-like projection comes into contact with the other flank of the serration, so that it is simultaneously in contact with the flanks of the serration, and the lengthwise position of the gauging pillar is then characteristic of the position of that serration.

The same applies in the case of a ridge where when the gauging pillar is turned, the cam-like projection straddles the ridge.

The gauging pillar may be displaceable axially with respect to the holding member to allow said cam-like projection to be entered into any serration or straddled over any ridge in the article.

By engaging in turn the cam-like projection in each of a straight series of serrations, in an article located by the abutment means, the successive positions of the pillar are characteristic of the positions of the serrations, and by measuring these positions from a datum, the pitch of the serrations may be evolved.

Alternatively there may be as many gauging pillars as there are serrations or ridges and a cam-like projection on each gauging pillar, a different gauging pillar being used to assess the position of each serration or ridge relative to a datum.

Again, the gauging pillar may have as many cam-like projections as there are serrations or ridges spaced axially of the gauging pillar in correspondence with a standard spacing of the serrations or ridges.

These, and one other form of the invention will now be described in detail with reference to the accompanying drawings whereof.

Figure 1:
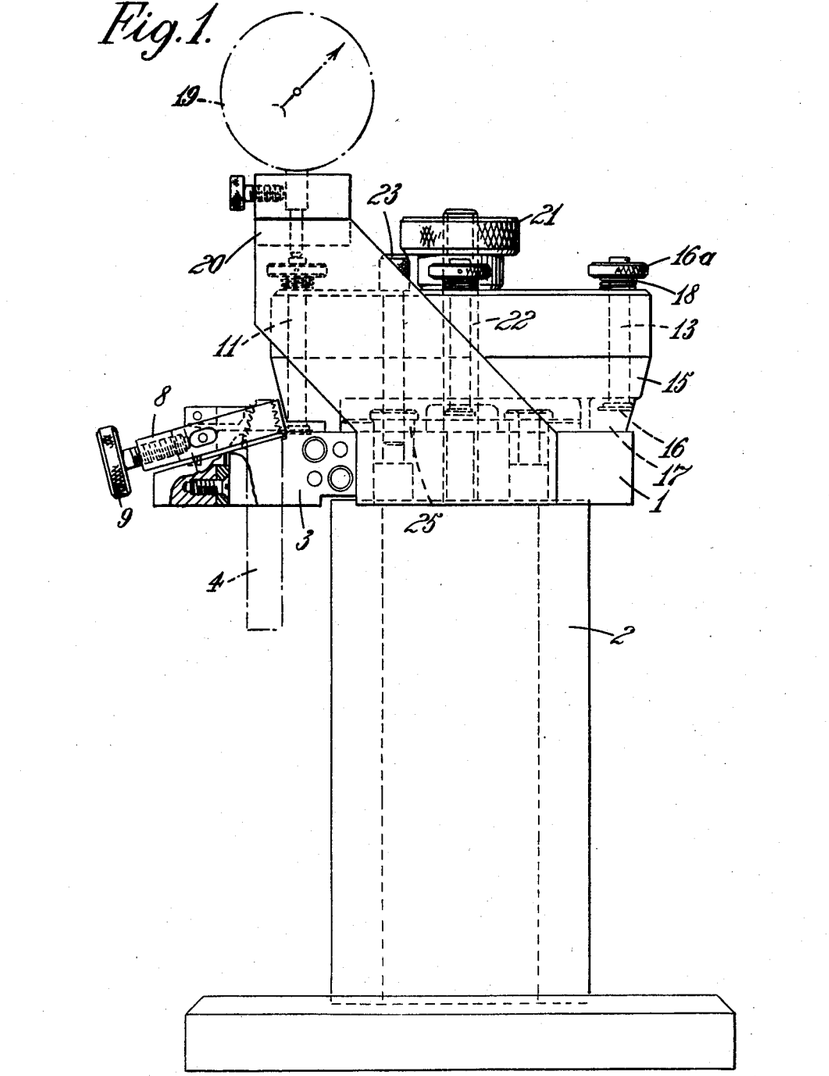
Figure 1 is a side view of one apparatus in accordance with the invention.
Figure 2:
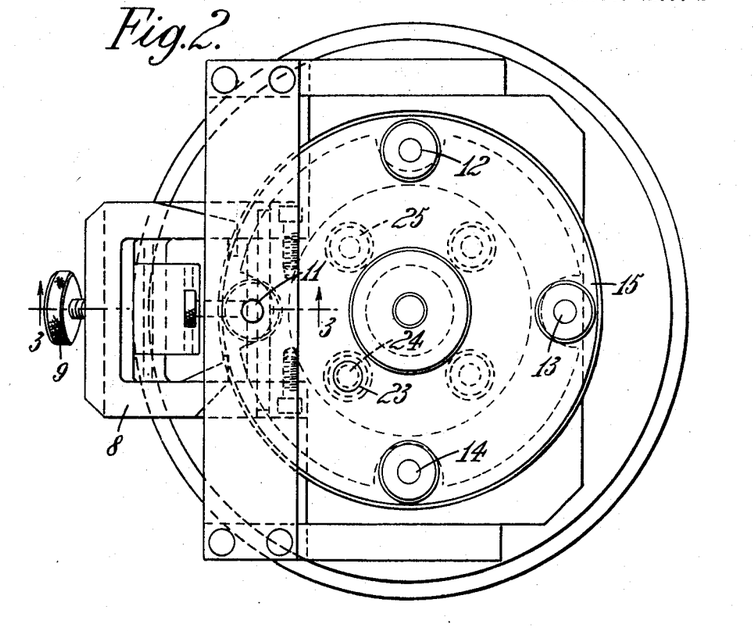
Figure 2 is a plan view of the apparatus shown in Figure 1.
Figure 3:
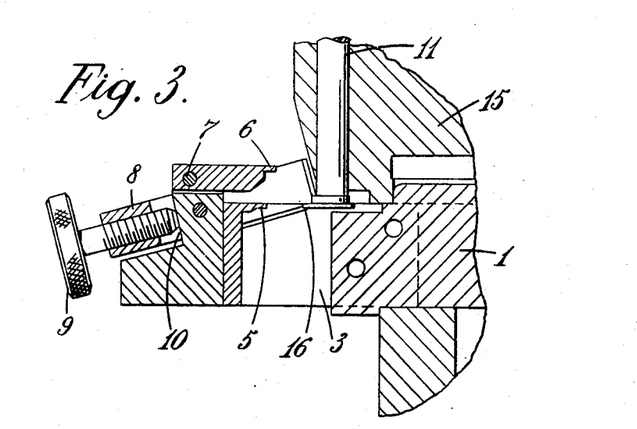
Figure 3 is a partial section along the line 3—3 in Figure 2.

The apparatus shown in Figures 1 to 3 comprises a platform 1 supported at a convenient height upon a supporting structure or pedestal 2. At one side the platform is provided with a rectangular hole 3 to receive a "fir-tree" root blade 4 to be inspected. The blade 4 is placed with its "fir-tree" root uppermost in the hole and is located with its axis perpendicular to the upper surface of the platform by a lower fixed abutment 5, which enters the root serration nearest the working portion of the blade on one side of the blade, and an upper abutment 6 which is hinged at 7 to permit slight up and down movement and enters the root serration furthest from the blade on the same side of the blade. The slight up and down movement of the abutment 6 permits manufacturing tolerance in the pitch of the serrations to be accommodated while ensuring that the vertical position of the blade is determined solely by the lower fixed abutment 5. A C-shaped clamp 8 is provided to draw the blade firmly against the abutments 5 and 6, this being achieved by tightening a set-screw 9 in the back of the clamp against an abutment surface 10 provided on a recessed part of the platform 1. When the setscrew 9 is tightened the jaws 6a of the C-clamp engage the root of the blade along the edges of the side of the root remote from the abutments 5 and 6 and draw the blade against the abutments 5 and 6 as stated above, a greater part of the length of the V-shaped serrations being left exposed between the jaws of the C-clamp so that the serrations may be engaged in turn by the projecting flanges later described.

In this example, the root of the turbine blade is provided with four V-shaped grooves on each side, that is to say, with two series of serrations each comprising four grooves, and the apparatus comprises a separate gauging pillar appropriate for each serration of a series. These gauging pillars are indicated by reference numerals 11, 12, 13 and 14 and are mounted with rotational and axial freedom in an approximately cylindrical holding member 15 which is itself journalled upon the platform 1 for rotation about an axis perpendicular to the surface of the latter, the arrangement being such that by rotation of the holding member the lower ends of the gauging pillars may be brought successively into proximity with the root of the blade. In this instance, the pitch of the grooves forming the root serrations is measured along a line (a reference line of pitch measurement) extending in the direction of the axis of the blade and the axes of the gauging pillars are accordingly arranged to be perpendicular to the surface of the platform so as to be parallel to the axis of the blade when the latter is located by the abutments 5 and 6.

At its lower end each gauging pillar is provided with a projecting flange or cam plate 16. These flanges have a circular periphery but are eccentric with respect to the axis of the gauging pillar and thus constitute one form of cam-like projection as hereinbefore referred to. The flanges have cylindrical outer peripheries and are bounded top and bottom by flat surfaces which are normal to the axis of the gauging pillar and are spaced apart by approximately the spacing of mid-points in the flanks of the V-shaped serrations in the blade root. It will be clear, therefore, that each such eccentric flange could roll along any one of the serrations of the blade root, whilst the axis of its pillar was maintained parallel but not fixed with reference to a line of pitch measurement, without causing axial displacement of the gauging pillar and that, therefore, whatever part of the flange happens to contact the flanks of the serration as a gauging pillar is turned, the final axial position of the gauging pillar will be the same. Similar results can be obtained with cam-like projections of different profile and non-rectangular shape in sectional planes parallel to the axis of the pillar and normal to the cam-like periphery and such a cam-like projection will be described later with reference to Figures 4 and 5.

The eccentric flange 16 of each gauging pillar is accommodated in a recess 17 in the underside of the holding member 15, the top surfaces of these recesses, which limit upward displacement of the pillars, being arranged at different heights corresponding to the different heights of the serrations in the blade root.

In each case, the height of the recess is somewhat greater than that which corresponds to the standard position of the serration so that a reasonable range of error can be covered. Each gauging pillar projects through the top surface of the holding member 15 and is provided with a knurled knob 16a so that it may easily be turned to cause its eccentric flange to enter a serration in the blade root. The knobs also serve to restrict downward movement of the gauging pillars beyond positions corresponding to reasonable downward errors in the positions of the serrations. In the example being given, light springs 18 are provided between the holding members 15 and the knobs 16a, although these could be between the member 15 and the eccentric flanges 16, to bias the gauging pillars towards one end of their permitted axial displacement.

The upper end surface of each gauging pillar is finished flat and square to the axis of the pillar and forms a reference point on the pillar. Each upper end surface serves as an abutment surface for the actuating pip of an adjustable datum dial gauge 19 carried by a bridge structure 20 fixed to the platform 1. As each gauging pillar is brought into operative relation between the dial gauge on the one hand and a blade root serration on the other hand by first rotating the holding member 15 and then bringing the eccentric flange into contact with the flanks of the groove by rotation of the pillar, a reading is obtained on the dial gauge which is characteristic of the axial position of that serration.

If, in the example being described, all the gauging pillars were made the same length from their upper abutment faces to their eccentric flanges, the readings of the dial gauge could be used directly to determine the pitch spacings of the serrations. In the present case, however, indications are required showing errors in relation to a standard pitch spacing, and these are obtained by making the gauging pillars of lengths differing successively by the successive serration pitches, the pointer of the dial gauge thus returning each time to a pre-set zero for zero pitch error. Alternatively, instead of making the gauging pillars of different lengths, a filling may be provided whereby slip gauges of appropriate thickness may be inserted between the gauging pillar abutment surfaces and the pip of the dial gauge. As a still further possibility, the dial gauge may be provided with a special scale or cursor system indicating a zero error position of the pointer for each serration.

As shown in Figures 1 to 3, the apparatus is additionally provided with a knurled knob or nut 21 screwthreaded upon a central stud 22 and serving to retain the holding member 15 upon the platform 1 and to lock it in any desired angular setting. This is an optional feature. Also, if desired, a pin 23 may be provided as shown, which can be inserted through a hole 24 in the member 15 into any one of a number of sockets 25 in the platform 1 so as to locate the holding member in successive positions in which a gauging pillar is brought to an operative position adjacent the blade root. It will be appreciated, however, that the accuracy of the readings is not dependent upon accurate location of the member 15.

Instead of using a separate gauging pillar for each serration, it is possible to use a single gauging pillar with a single cam-like projection on it. With this arrangement, pitch is measured directly, but an auxiliary device may be provided, if error readings are desired. Such an apparatus incorporating an auxiliary device will now be described.

Figure 4:
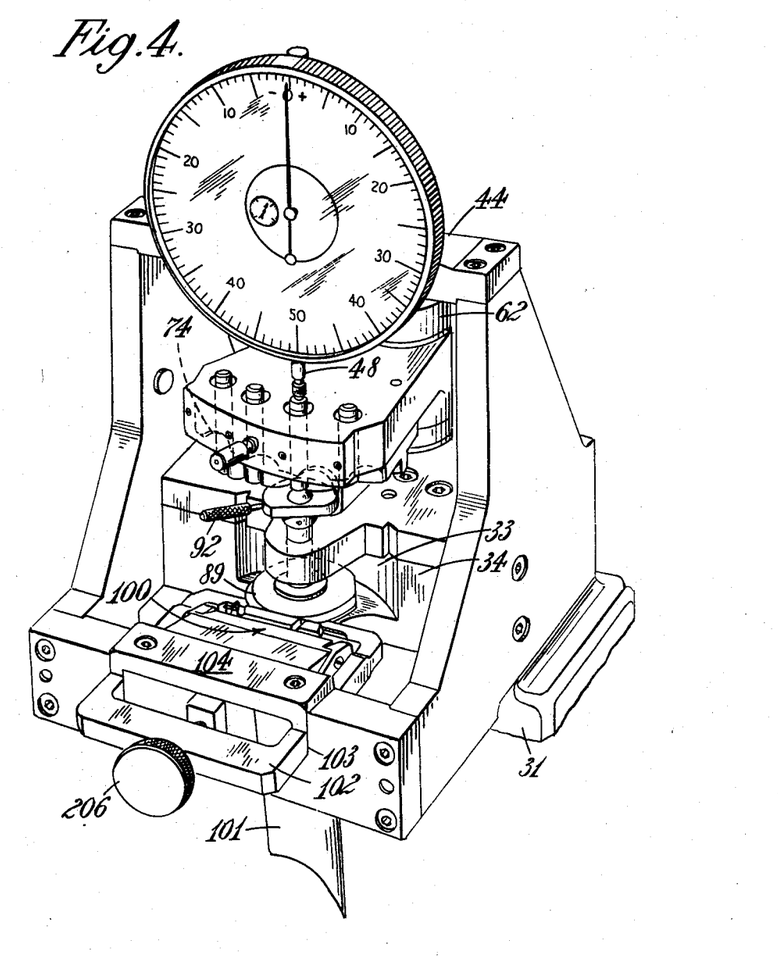
Figure 4 is a perspective view from one side and above of another apparatus in accordance with the present invention.
Figure 5:
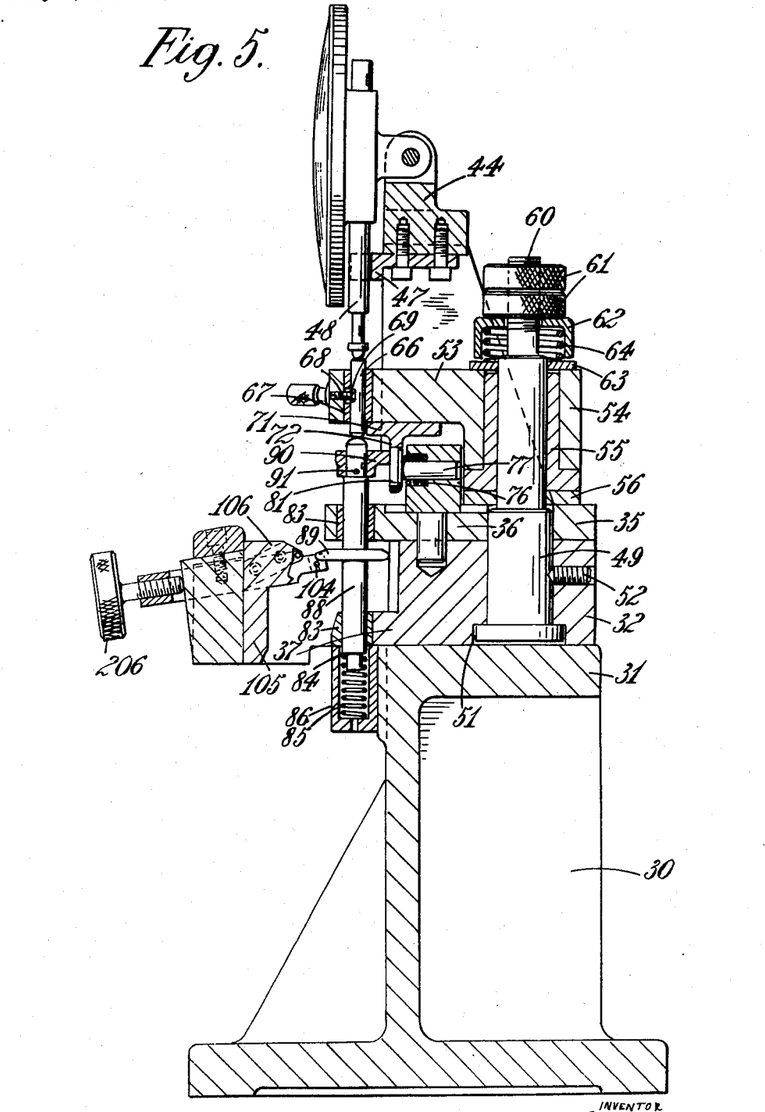
Figure 5 is a side elevation in cross-section of the apparatus shown in Figure 4.
Figure 6:
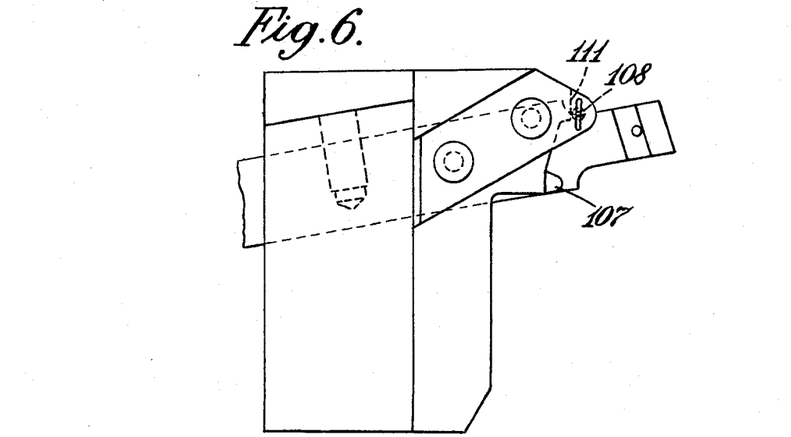
Figure 6 is a partial view of Figure 5 to a larger size showing more clearly a certain detail of construction.

Referring now to Figures 4, 5 and 6, the apparatus according to the invention here shown, comprises a base 30 having a platform part 31 upon which is mounted a block 32. The block 32 has a cylindrical-segment shaped recess 33 in the centre of its front face 34, and a plate 35, carried on top of the block 32, has a lug 36 extending beyond the face 34 of the block over the recess 33, and a similar but smaller lug 37 is formed integrally with the block 32, the lugs 36 and 37 being spaced apart vertically and forming a holding member or yoke for a gauging pillar later described.

Attached to each side of the block 32 is a generally L-shaped side member 38 having one limb 39 extending above the top of the block and its other limb 40 projecting in front of the block and also the platform part 31. The limbs 39 are bridged by a bridge piece 44 having a pair of spaced apart upstanding lugs 41 (see Figure 5) between which is mounted the attachment fixture 42 of a dial gauge 43, and the limbs 40 are bridged by a bridge piece 45 which carries a clamp for a "fir-tree" root blade. This clamp differs slightly from the clamp previously described with reference to Figures 1 to 3 and will be described in detail later.

The bridge-piece 44 carries on its underside a bracket 47 having a part-circular opening through which passes a sleeve 48 housing the operating rod of the dial gauge, the bracket 47 and the lugs 41 supporting the gauge with its operating rod disposed vertically and depending from the gauge in front and in the centre of the rectangular frame formed by the limbs 39 of the side members 38 the bridge-piece 44 and the plate 35.

The block 32 and the plate 35 have aligned vertical bores in which is situated a stud 49. The stud has a smaller diameter portion projecting upwardly from the plate 35 and is located by a flange 50 at its lower end, which flange seats in an enlargement 51 of the bore in the block, the stud being fixed to the block by a set screw 52. The stud 49 is positioned centrally of the block to the rear of the rectangular frame formed by the side members 39 and the cross-piece 44 and carries a disc-segment shaped gauge pin supporting member 53 hereinafter termed the segment, which projects through the frame. The segment has a boss 54 which is bored to receive the stud 49, the bore being lined with a bushing 55. The stud passes upwardly through the bushing 55, a washer 56 being interposed between the bushing and the plate 35, and at its free end, where it projects from the segment, the stud has a reduced diameter portion 60 which is threaded and carries a pair of clamping lock nuts 61. A spring box 62 threaded onto the portion 60 between the nuts 61 and a washer 63 which lies against the segment houses a coil spring 64 engaged between the box and the washer. In this manner, the segment is resiliently held against the top of the block and tends to remain in its set position.

Disposed along an arc centred upon the axis of the stud 49 and at a radius equal to the distance between the long axes of the operating rod of the dial gauge and the stud 49 are four gauging pins 66 slidably mounted in vertically disposed bores in the segment 53. The bores are lined each with a bushing 67, and a retaining screw 68 projects horizontally into each bore and engages in a slot 69 in the gauging pin received in the bore to hold the gauging pin in place. The slots 69 are made long enough to give the gauging pins 66 a small amount of up-and-down play for a purpose which will hereinafter appear. Each gauging pin projects above and below the segment and is of a length determined by the measurements which the apparatus is required to perform as clearly explained later in this specification.

Attached to the lower surface of the segment between the gauging pins 66 and the boss 54 is an arcuate T-sectioned segment location plate 71 having a depending arcuate flange 72 centred on the axis of the stud 49. The flange 72 has four part-circular recesses 74 in its free edge each positioned about a radius of the segment passing through the long axis of one of the gauging pins 66.

Carried by the block 32 so as to lie between the flange 72 and the boss 54 is a plunger block 75 having a horizontal bore lying in the vertical plane, hereinafter termed the central vertical plane, containing the long axes of the stud 49 and the operating rod of the dial gauge. The bore in the block 75 has a shoulder 76 between which and the head 81 of a headed plunger 77 is positioned a coiled spring 80, the spring 80 being threaded onto the plunger and urging the head 81 away from the block 75.

A handle is provided on the segment to turn it, and as each gauging pin is brought vertically beneath the operating rod of the dial gauge the head 81 moves into alignment with a recess 74 and may be displaced against the action of the spring 80 to enter the recess and lock the segment against further hinging movement. The head 81 is displaced in this manner as later described. The headed plunger 77, therefore, forms a detent which is capable of locking the segment in the operative position of each gauging pin. The segment is released for hinging movement by movement of the plunger 77 under the action of the spring 80 to carry the head 81 clear of the recess 74 in which it is engaged in a manner hereinafter described.

The lugs 36, 37 have aligned bores in the central vertical plane, and these bores are lined each with a bushing 83 which slidably receive a circular sectioned gauging pillar 88 which is rotatable in the bushings 83. The lower end of the pillar is formed with a shoulder 84 which engages one end of a coiled spring 85 housed and seated in a spring seat 86 attached to the base 31.

Between the lugs 36, 37 the pillar 88 carries a cam-like projection or flange 89 having a part-circular periphery. The flange 89 is similar to the flanges 16 previously described in that it has top and bottom surfaces which are flat and disposed normal to the long axis of the pillar 88, and the flange is likewise eccentrically mounted with respect to the long axis of the pillar 88 so that by turning the pillar, the flange can be brought into engagement with a V-shaped groove in a blade root held in the clamp still yet to be described. Unlike the flanges 16, however, the flange 89 has a V-shaped edge-section with a rounded nose. The included angle of the V-shaped edge-section is, however, made less than that of the V-shaped grooves, the pitch of which is to be measured, so that when the pillar 88 is turned to engage the flange 89 in a groove the rounded nose on the flange 89 engages the flanks of the groove.

The pillar 88 projects upwardly from the lug 36 and has a rounded end which engages the lower end of each gauging pin 66 when the segment 53 is turned to bring the gauging pin into the central vertical plane, the spring 85 allowing vertically downward displacement of the pillar to accommodate different lengths of gauging pin. Towards its free end the pillar is reduced in diameter to form a shoulder on which seats a cam 90 fixed to the pillar by means of a tapered pin 91. The cam 90 is shaped, dimensioned and arranged so that when the pillar 88 is turned to carry the flange 89 out of engagement with a groove in the root of a "fir-tree" root blade held in the clamp, the cam 90 releases the plunger 77 and frees the segment 53 for hinging movement as previously described. The pillar 88 is rotated by means of a handle 92 (see Figure 4) carried by the cam 90.

The limbs 40 of the side members 39, the bridge-piece 45 and the block 32 form a horizontally disposed rectangular frame up through which a "fir-tree" root blade is inserted, root first to be gripped in a clamp generally indicated at 100. Figure 4 shows such a blade, denoted by reference numeral 101.

As before the clamp comprises a C-shaped member 102, which in the present case is loosely carried in a pair of slots 103 in the bridge piece 45, a cover plate 104 closing the open tops of the slots to prevent the member 102 being removed. A blade location block 105 is fixed to the inner surface of the bridge piece 45 between the slots 103 and this has a flange portion 106 which projects towards the pillar 88. Referring to Figure 6, the flange portion 106 has formed along its lower edge a ridge or abutment 107 which is V-shaped in cross-section with a rounded nose, and which corresponds in shape to the edge-section of the flange 89 so that it may engage in a groove in a "fir-tree" blade root. The ridge 107 is arranged to engage in the first or datum groove (i.e. the groove nearest the working portion of the blade) on one side of the root, and a horizontally disposed roller 108 carried between a pair of arms 109 attached one to each side of the block 105, is arranged to engage in a groove on the same side of the root but nearer the tip of the root. The roller 108 is loosely mounted in vertical slots 110 in the arms 109 so that the roller may roll up or down a vertically disposed anvil surface 111 on the flange portion 106 sufficiently to accommodate any errors likely to be found in the spacing of the grooves in a blade root. The blade root is drawn against the ridge 107 and the roller 108 by member 102 as previously described. In this case, however, the member 102 is provided with fixed circular sectioned bars 204 to engage in the ends of a groove on the other side of the blade root, the central part of the groove being left free for engagement by the flange 89. The member 102 is of sufficiently easy fit in the slots 103 to allow the bars 204 to line up with a groove on the other side of the blade root, and when drawn up by its clamping screw 206 is supported at the bars 204 and the point of the screw 206.

In use, a "fir-tree" root blade is mounted in the clamp 100 as described, the root being located positionally with respect to the apparatus by the ridge 107 engaging in the datum groove in one side of the root. Furthermore, the roller 108 ensures that the axis of the blade, which is the reference direction for pitch measurement, is parallel to the long axis of the pillar 88 and the gauge pins 66.

The apparatus just described is designed for checking the pitch of the grooves in a "fir-tree" root having a series of serrations comprising four grooves on each side, and to this end, four gauging pins 66 are provided of lengths differing successively by the standard pitch spacing of the four grooves, the upper and lower end surfaces of each pin being finished flat and square to the axis of the pin in each case. The pins 66 are arranged in order of length from left to right in Figure 4, the longest on the left, and after the blade the root of which is to be checked has been mounted in the clamp 100 the segment 53 is moved to bring the longest pin 66 into the central vertical plane between the operating pip of the dial gauge and the top of the pillar 88. In this position, the pin is pushed to the upper limit of its travel as determined by its retaining screw 68 and slot 69 by spring 85.

Movement of the longest pin 66 into operative position as described brings the flange 89 approximately into the horizontal plane containing the first groove in the blade root i.e. the groove nearest the working portion of the blade. The pillar 88 is then turned by means of handle 92. This has two effects, namely, the cam 90 pushes the head 81 of the plunger 77 into the recess 74 lying in the central vertical plane, thus locking the segment, and the rounded nose of the flange 89 enters the datum groove and engages the flanks of the groove at the same time adjusting the pillar 88 longitudinally with respect to the apparatus. The dial gauge is then set to a zero reading by means of the usual zeroing adjustment provided on the gauge.

The pillar 88 is then turned to disengage the flange 89 from the datum groove, the cam 90 at the same time allowing the spring 80 to displace the head 81 out of the recess 74 and thus unlock the segment, and the segment is moved to bring the next gauging pin 66 into the central vertical plane. The operation is then repeated as just described, the gauge reading being characteristic of the longitudinal position of the next groove relatively to the datum groove and showing any errors in its pitch spacing from the datum groove. In this manner, the pitch of the series of grooves on one side of the root are checked.

The blade is then turned round in the clamp 100 and the measurement steps as just described repeated. The gauge is not however "zeroised" on the datum groove, and thus any dial reading recorded while measuring on the first groove indicates an "offset" error between the first grooves on each side of the root of the blade, the offset error being one half the error recorded on the gauge. The "offset" error is the vertical spacing of the first grooves on each side of the root of the blade, and if an "offset" error occurs this must be taken into account when measuring errors in the pitch of the serrations on the second side of the root of the blade.

In view of the fact that the up and down movement of the gauging pins 66 is limited to maximum and minimum error readings by the screws 68 it will be appreciated that with the apparatus described with reference to Figures 4, 5 and 6, it is not possible to operate with one only of the pins 66 and measure the pitch of a series of grooves in a "fir-tree" blade root directly, but only departures from a standard pitch can be measured in each case.

Figure 7:
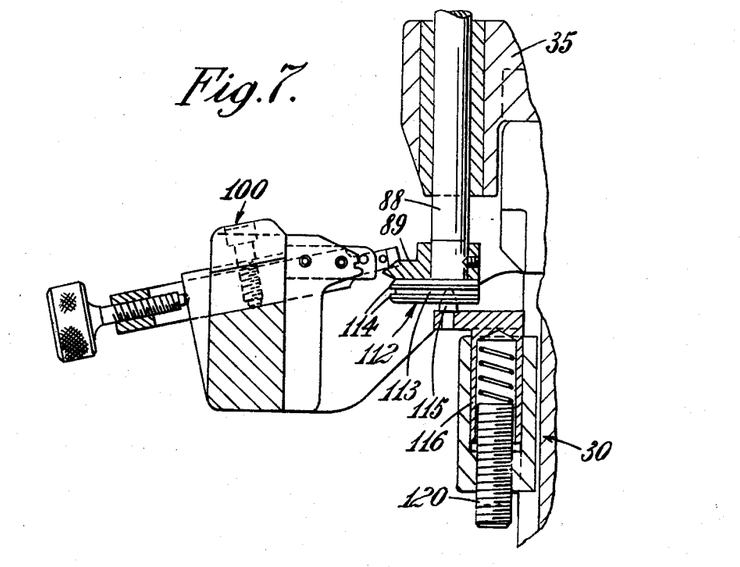
Figure 7 is a partial side elevation in cross-section of the apparatus shown in Figure 4 showing a modification of the apparatus.

A modification of the apparatus just described is shown in Figure 7. Referring to this figure, it will be noted that the pillar 188 which corresponds to the pillar 88 previously described as well as having the flange 189 with a V-section peripheral edge corresponding to the flange 89 previously described, also carries a further cam-like projection in the form of a part-circular flange 112. The flange 112 is eccentric with respect to the axis of the pillar 188 and has a peripheral groove 113, the side walls of which are disposed normal to the axis of the pillar 188, and spaced so that the edges 114 of the groove may contact the inwardly diverging flanks of a ridge between an adjacent pair of grooves in a "fir-tree" root intermediately of their height. To this end, the peripheral edge section of the flange 112 is rounded in profile so that the flange may enter an adjacent pair of grooves and allow the edges 114 to contact the flanks of the ridge between them.

It will be appreciated that like the flange 189 the flange 112 could roll along a ridge in a straight series of serrations while contacting the flanks of the ridge without the pillar 188 being displaced axially and with its axis maintained parallel to the reference direction of pitch measurement of the serrations.

The clamp 100 shown in Figure 7 is the same as previously described, but it will be noted that the means for supporting the pillar 188 is slightly different. The pillar 188 is slidable in a single vertical bore in the plate 35 and is supported at its lower end on a pivot 115 carried on an arm 116 extending from a tubular spring housing 116a slidable in a bore in a spring seat 117 attached to the front of the base 30, a coiled spring 118 engaging between the upper end of the housing 116a and a set screw 120 screwed through the bottom of the spring seat 117 and into the lower end of the housing 116a.

The apparatus of Figure 5 modified as shown in Figure 7 is used to check the pitch of the ridges on each side of a "fir-tree" root, the flange 89 being used first to check any "off-set" error between the first grooves on each side of the root as previously described. A gauge pin 66 is provided for checking the "off-set" error and a gauge pin for checking the position of each ridge, the pins each being of a predetermined length so that departures from a standard pitch for the ridges may be measured as previously described for the grooves.

Figure 8:
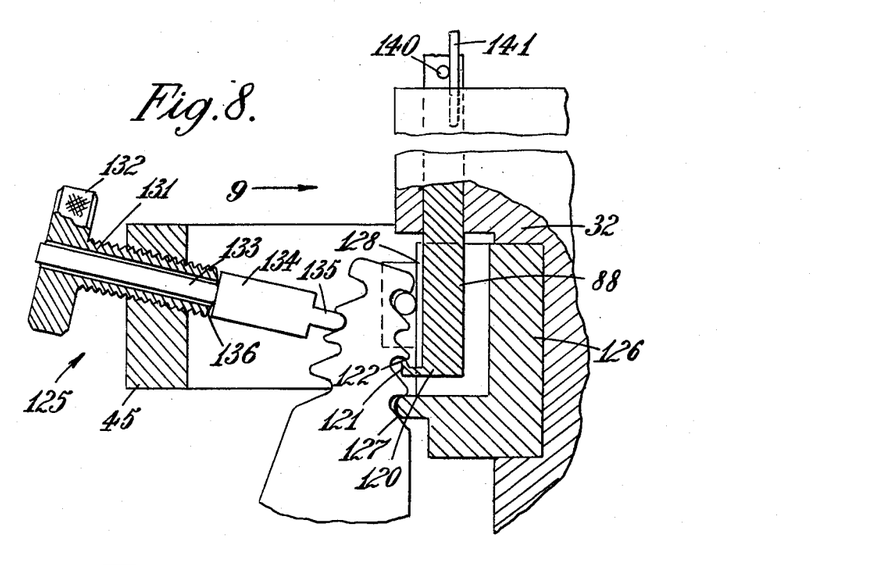
Figure 8 is a partial side elevation in cross-section of the apparatus shown in Figure 4, showing another modification of the apparatus.
Figure 9:
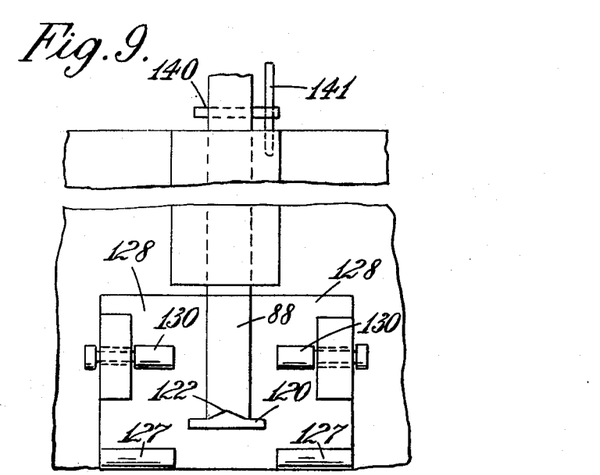
Figure 9 is a view in the direction of arrow 9 in Figure 8, with part removed to show more clearly details of construction.

The apparatus of Figure 5 may also be modified as shown in Figures 8 and 9. Referring to these figures, the gauging pillar 288 carries at its lower end a cam-like projection or flange 120 which has a part circular periphery 121 centered on the axis of the gauging pillar, the flange having a straight edge or "flat" tangential to the surface of the pillar 288. Opposite the straight edge the flange has at its periphery an upstanding pip 122 to engage one flank of each serration on the root of a "fir-tree" root blade located by the clamp generally indicated at 125, as hereinafter more fully explained.

The modifications now being described are for the purpose of enabling the instrument of Figure 5 to be used for checking serrations which are dimensioned with a close manufacturing limit on one flank of each serration only, in which case it is necessary to be able to check the pitch of the serrations from these flanks of the serrations alone. As previously explained these flanks in the case of a "fir-tree" root blade are the flanks which take the centrifugal loading on the blade when this is in operation, and on the accuracy of their pitch spacing depends the correct distribution of the centrifugal load between them.

In measuring the pitch of a series of serrations on the root of a "fir-tree" root blade from the bearing flanks of the serrations which take the centrifugal force on the blade, the reference line of pitch measurement of the serrations as taken from these flanks runs approximately parallel to the crests of the serrations, and consequently the reference lines of pitch measurement for the serrations on the two sides of the root of the blade do not coincide as previously with the axis of the blade but make an angle therewith and with one another. The angles which two reference lines make with the axis of the blade should be equal, but if there is an error in one of them and the blade is located by the datum serration on the side of the blade remote from the serrations being checked for pitch error, then the serrations being checked will not have a reference line of pitch measurement parallel with the axis of the gauging pillar and apparent errors will occur. To defeat this source of apparent error the clamp is modified so as to locate the blade with reference to the datum serration in the series of serrations being checked. To this end referring again to Figures 8 and 9 the abutment means comprises a blade location block 126 attached to the member 32, the block having a pair of flanges horizontally disposed edges 127 of which form a pair of fixed abutments arranged to enter and engage the flanks of the datum serration of the series of serrations to be checked.

To this end the flanges 127 have rounded nose portions and are spaced apart horizontally as shown in Figure 9 one on each side of the pillar 288 so as to engage in the end portions of the datum serration thus leaving a middle portion of the datum serration free so that it may be operated upon by the flange 121. The block 126 also carries a pair of floating rollers 130 one on each side of the pillar 288, these rollers being free to move vertically towards and away from the fixed abutments 127 along anvil surfaces 128 much as previously described. The rollers 130 are dimensioned and arranged to enter the last serration in the series to be checked, and engage the flanks of the serration, the up and down play of the rollers ensuring that they can take up their correct position in spite of any errors in pitch in the serrations which may have occurred. Like the abutments 127, the rollers engage in the end portions of the last serration only and leave the middle portion of the serration free to be operated upon by the flange 121. The rollers 130 and the fixed abutments 127 are arranged to locate a "fir-tree" root blade with a reference line of pitch measurement of the serrations as measured from the bearing flanks of the serrations, i.e. the flanks facing the tip of the blade, parallel with the axis of the pillar 288 and a "fir-tree" root blade the serrations on the root of which are to be checked is clamped against the fixed abutments by means of a screw-threaded clamping device generally indicated at 125. The device 125 comprises a hollow threaded stud 131 having a knob 132 received in a threaded bore in the bridge piece 45. The axis of the stud 131 is arranged normal to the direction of the axis of a blade clamped against the rollers 130 and the fixed abutments 127, and a rod 133 passes through the stud 131 with clearance the rod 133 having a head 134 formed with a flange 135 having a rounded nose portion dimensioned so that it can enter and engage the flanks of an intermediate serration on the side of the blade remote from the serrations to be checked. The stud 131 has a rounded end 136 which engages behind the head 134 so that as the stud is screwed in the rounded end 136 pushes the head, and therefore the flange 135 against the blade to clamp the blade against the fixed abutments 127 and the rollers 130. The fact that the rod 133 is a loose fit in the bore of the hollow stud 131 and the end 136 is rounded allows the flange to adjust its angular position to a small extent and thus correctly engage in a serration in the blade root. The pillar 288 carries a pin 140 which projects normally to the axis of the pillar so as to engage a stop 141 carried by the holding member when the pip 122 lies in the central vertical plane of the apparatus. The pin 140 and the stop 141 thus ensure that the pillar is always turned to the same operative position.

In use a "fir-tree" root blade the pitch of the serrations on the root of which are to be checked as measured from the bearing flanks of the serrations is mounted in the clamp 125. The segment 53 is then moved to bring the longest pin 66 into the central longitudinal plane between the operating pip of the dial gauge and the top of the pillar 288 and the pillar 288 rotated to bring the pip 122 into contact with the bearing flank of the datum serration the pin 140 then engaging the stop 141. The gauge is then zeroised. The pillar 288 is then rotated to carry the pip 122 clear of the datum serration, thus unlocking the segment 53 as previously described, and the segment is moved to bring the next longest pin 66 into the central vertical plane. The pillar 288 is again rotated to bring the pip 122 to its operative position engaging the bearing flank in the next serration and any error in pitch spacing between the bearing flank of the datum serration and the bearing flank of the next serration recorded. Measurements are made in this manner on all the bearing flanks of the four serrations in the series, and the blade then turned round and the same procedure again adopted.

It will be appreciated that the gauging pins 66 differ in length by the standard pitch spacing of the serrations as measured from the bearing flanks of the serrations.

As previously described for the pillar 188 the pillar 288 is spring urged upwardly by a spring (not shown) so that as each gauging pin is moved to the central vertical plane the pillar is moved axially to align the flange 120 approximately with the serration to be checked.

The stop 141 ensures that the pip 122 engages in turn the bearing flanks at a series of points in a common plane parallel to the reference line of pitch measurement of the serrations as measured from the bearing flanks of the serrations. This is essential to the accuracy of pitch measurements made from one flank of each serration only, since as shown in Figure 8 the bearing flanks are not normal to the axis of the pillar when the blade is located by the abutment means and consequently if pitch measurements are made from points on the bearing flanks which are spaced horizontally apparent errors will occur.

In another apparatus according to the invention, a cam-like projection for each serration may be provided on a single gauging pillar, but if more than two such projections are required, the gauging pillar holder is made retractable to allow successive projections to be brought into use. The number of projections which can be used on a single pillar is also limited by the onset of interference due to more than one projection contacting the work at the same time.

Although a pivoted gauging pillar holder and a pivoted gauging pin support have been shown in the drawings, it is to be understood that movement in a straight path may be used if desired.

Although the invention has been specifically described with reference to apparatus for checking or measuring the pitch of the V-shaped serrations in the root of a "fir-tree" root blade for a turbine or the like, it is to be understood that apparatus in accordance with the invention may be used for checking or measuring the pitch of any straight series of two or more grooves or serrations as defined.

I claim:

1. Apparatus for checking or measuring a straight series of two or more grooves or serrations as defined comprising support means, gauging pillar means journalled with rotational and axial freedom in said support means, abutment means separate of said gauging pillar means and carried by said support means for locating an article having a straight series of two or more grooves or serrations as defined in a reference position with a reference line of pitch measurement of the grooves or serrations parallel to the direction of axial freedom of the gauging pillar means, cam-plate means fixed on said gauging pillar means, peripheral contacting means on said cam-plate means for engaging at least one flank of said grooves or serrations to be checked or measured, means on said support means for moving said gauging pillar means and contacting means into operational position whereby by rotation of said gauging pillar means at least said one flank of each of said grooves or serrations is successively engaged by said peripheral contacting means when the article is located by said abutment means, and means on said support means operatively connected to said gauging pillar means for indicating changes in a dimension extending in the direction of axial freedom of the gauging pillar means between a point on the gauging pillar means and a point fixed relatively to said abutment means.

2. Apparatus as claimed in claim 1, wherein the support means includes a holding member, said gauging pillar means comprises as many gauging pillars as there are serrations in a straight series of serrations, the pitch of which are to be checked or measured, on the root of a "fir-tree" root blade, and a cam plate on each gauging pillar, said gauging pillars each being mounted in said holding member which is made movable to bring the cam-plate on each gauging pillar successively into an operational position with respect to the root when the blade is located by said abutment means, each gauging pillar being mounted in the holding member with limited freedom of axial movement in both directions from a position corresponding to a standard position of a different one of the serrations.

3. Apparatus as claimed in claim 2, wherein the holding member is pivoted on a vertical pivot carried by the support means, and the gauging pillars are carried in vertical bores in the holding member, the cam-plates lying each in a separate recess in the underside of the holding member, and projecting from the periphery of the holding member, the axial movement of each gauging pillar being limited in the upward direction by the top surface of the recess in which its cam-plate is positioned.

4. Apparatus as claimed in claim 3, wherein locking means comprising a pin is provided to lock said holding member in each of its positions in which a cam-plate is in an operational position, said pin, when in its locking position passing downwardly through a bore in the holding member with its lower end received in a socket in the support means.

5. Apparatus as claimed in claim 3, wherein means is provided to lock said holding member in each of its positions in which a cam-plate is in an operational position, said locking means comprising a clamping nut threaded onto said vertical pivot.

6. Apparatus as claimed in claim 3, wherein said abutment means comprises a fixed abutment carried by said supporting structure and shaped and arranged to enter and engage the flanks of the serration on the root of a "fir-tree" root blade on one side of the root nearest the working portion of the blade, a second abutment hinged about a horizontal axis so as to be movable towards and away from the fixed abutment, the second abutment being shaped and arranged to enter and engage the flanks of another serration on said one side of the root, and means to clamp the root of a "fir-tree" root blade against said abutments, the abutments positioning the blade with a reference line of pitch measurement of the serrations on the side of the root remote from the abutments disposed vertically.

7. Apparatus as claimed in claim 3, wherein the axial movement of each gauging pillar is limited in the downward direction by the upper surface of the holding member, each gauging pillar projecting above said upper surface and carrying a knob or the equivalent by means of which it may be turned.

8. Apparatus as claimed in claim 7, wherein a light spring is provided for each gauging pillar, the spring urging the pillar to one end of its permitted axial travel.

9. Apparatus as claimed in claim 2, wherein means is provided to lock said holding member in each of its positions in which a cam-plate is in an operational position.

10. Apparatus as claimed in claim 2, wherein each cam-plate consists of a flange having at least a part-cylindrical periphery, the flange being eccentric with respect to the axis of the gauging pillar on which it is carried, and having flat top and bottom surfaces normal to the axis of the gauging pillar.

11. Apparatus as claimed in claim 1, wherein said gauging pillar means comprises a gauging pillar and said cam-plate means comprises as many cam-plates as there are serrations in a straight series of serrations, the pitch of which are to be measured or checked, on the root of a "fir-tree" root blade, these cam-plates being spaced axially of the gauging pillar in correspondence with a standard spacing of the serrations.

12. Apparatus as claimed in claim 1, wherein said article is a "fir-tree" root blade having a straight series of two or more serrations therein, said gauging pillar means comprises one gauging pillar, said cam-plate means comprises one cam-plate, and said moving means includes the rotational and axial journalled mounting of the pillar in the support means so that by the axial and rotational movement of the pillar the cam-plate will be entered in turn into each of the serrations and made to engage in turn corresponding flanks of each serration from which pitch measurements are to be made at a series of points in a common plane parallel to said reference line of pitch measurement.

13. Apparatus as claimed in claim 12, wherein said support means includes a holding member which supports said gauging pillar vertically, and said apparatus further comprises a plurality of gauging pins, one for each of said serrations, supported vertically and above said gauging pillar with limited freedom of axial movement in a pin supporting member pivoted to said holding member about a vertical axis, the gauging pins being arranged so that they may have their long axes successively aligned with the axis of the gauging pillar by movement of the pin supporting member and so that they may contact the gauging pillar when it is moved axially to allow said cam-plate to be entered into one of said serrations, the gauging pins differing successively in length by a standard pitch to which successive serrations of the straight series of serrations to be checked or measured should conform, and the top surface of each gauging pin being flat and normal to its long axis and forming a reference surface each containing a reference point which is fixed relatively to said gauging pillar when the pin is in contact with the pillar.

14. Apparatus as claimed in claim 13, wherein means is provided to lock said pin supporting member to said holding member in each of its positions in which a gauging pin is aligned with said gauging pillar.

15. Apparatus as claimed in claim 14, wherein said locking means comprises a detent carried by said holding member, which detent is displaceable to an operative position against the action of a spring in which operative position it engages in a different recess in the pin supporting member when the pin supporting member is in each of its said positions, and said gauging pillar carries a cam which engages said detent and moves it to an operative position when the gauging pillar is turned to engage said cam-plate with the root of a blade located by said abutment means.

16. Apparatus as claimed in claim 13, wherein said abutment means comprises a fixed abutment carried from said holding member and shaped and arranged to enter and engage the flanks of the serration on the root of a "fir-tree" root blade on one side of the root nearest the working portion of the blade, a second abutment slidable towards and away from the fixed abutment along a vertically disposed anvil surface, the second abutment being shaped and arranged to enter and engage the flanks of another serration on said one side of the root, and means to clamp the root of a "fir-tree" root blade against said abutments, the abutments positioning the blade with a reference line of pitch measurement of the serrations on the side of the root remote from the abutments disposed vertically.

17. Apparatus as claimed in claim 12, wherein said abutment means comprises a fixed abutment shaped and arranged to enter and engage the flanks of the serration on the root of a "fir-tree" blade root on one side of the root nearest the working portion of the blade, a second abutment, movable towards and away from the first-mentioned abutment, the second abutment being shaped and arranged to enter and engage the flanks of another serration on the same side of the root as the serration the flanks of which are engaged by said fixed abutment, and means to clamp the root of a "fir-tree" root blade against said abutments, the abutments positioning the blade with a reference line of pitch measurement of the serrations on the side of the root remote from the abutments disposed parallel with the axis of the gauging pillar.

18. Apparatus as claimed in claim 12, wherein said cam-plate comprises a flange having a part circular periphery concentric with the axis of the gauging pillar, said flange having at its periphery a pip to engage said corresponding flanks of the serrations the pitch of which, as measured from said corresponding flanks of the serrations, is to be checked.

19. Apparatus as claimed in claim 18, wherein the apparatus further comprises stop means to locate the gauging pillar in a fixed angular orientation with respect to the apparatus when the pillar is rotated to move said pip into engagement with a flank of a serration on the root of a "fir-tree" root blade located by said abutment means.

20. Apparatus as claimed in claim 12, wherein said abutment means comprises a pair of fixed abutments carried from said support and shaped and arranged each to enter and engage one end portion of the flanks of the serration on the root of a "fir-tree" root blade on one side of the root nearest the working portion of the blade, a second pair of abutments slidable vertically towards and away from the fixed abutments, said second pair of abutments being shaped and arranged each to enter and engage one end portion of the flanks of another serration on the said one side of the root, and means to clamp the root of a "fir-tree" root blade against said abutments, the abutments positioning the blade with a reference line of pitch measurement of the serrations, is measured from one flank of each serration, on the side of the root adjacent the abutments disposed parallel with the axis of the gauging pillar.

21. Apparatus for checking or measuring a straight series of two or more serrations as defined in the root of a "fir tree" root blade comprising support means comprising a holding member; gauging pillar means comprising a gauging pillar journaled with rotational and axial freedom in said holding member; abutment means separate of said gauging pillar means and carried by said support means for locating a "fir tree" root blade having a straight series of two or more grooves or serrations as defined in a reference line of pitch measurements of the grooves or serrations parallel to the direction of axial freedom of the gauging pillar; cam plate means fixed on said gauging pillar; peripheral contacting means on said cam plate means for straddling the ridges between adjacent serrations for engaging at least one flank of said serrations to be checked or measured; means on said support means for moving said gauging pillar means and peripheral contacting means into operational position whereby by rotation of the said gauging pillar means a ridge between adjacent serrations is engaged by said peripheral contacting means, said gauging pillar means being supported with an axial freedom such that it may be displaced axially with respect to said support means to allow said peripheral projections to be straddled over any ridge of the serrations, and said apparatus further comprising means on said support means operatively connected to said gauging pillar means for indicating changes in a dimension extending in the direction of axial freedom of the gauging pillar means between a point on the gauging pillar means and a point fixed relatively to said abutment means.

22. Apparatus as claimed in claim 21 wherein said gauging means comprises as many gauging pillars as there are ridges in the straight series of serrations, the pitch of which are to be checked or measured on the "fir tree" root blade, said cam plate means comprises a cam plate on each gauging pillar, said gauging pillars each being mounted in said holding member which is made movable to bring the cam plate on each gauging pillar successively into an operational position with respect to the root when the blade is located by said abutment means, each gauging pillar being mounted in the holding member with limited freedom of axial movement in both directions from a position corresponding to a standard position of a different one of the ridges.

23. Apparatus as claimed in claim 22, wherein the holding member is pivoted on a vertical pivot carried by said support means, and the gauging pillars are carried in vertical bores in the holding member, the cam plates lying each in a separate recess in the underside of the holding member, and projecting from the periphery of the holding member, the axial movement of each gauging pillar being limited in the upward direction by the top surface of the recess in which its cam plate is positioned.

24. Apparatus as claimed in claim 23, wherein the axial movement of each gauging pillar is limited in the downward direction by the upper surface of the holding member, each gauging pillar projecting above said upper surface and carrying a knob or the equivalent by means of which it may be turned.

25. Apparatus as claimed in claim 24, wherein a light spring is provided for each gauging pillar the spring urging the pillar to one end of its permitted axial travel.

26. Apparatus as claimed in claim 23, wherein said abutment means comprises a fixed abutment carried by said support means and shaped and arranged to enter and engage the flanks of the serration on the root of a "fir-tree" root blade on one side of the root nearest the working portion of the blade, a second abutment hinged about a horizontal axis so as to be movable towards and away from the fixed abutment, the second abutment being shaped and arranged to enter and engage the flanks of another serration on said one side of the root, and means to clamp the root of a "fir-tree" root blade against said abutment, the abutments positioning the blade with a reference line of pitch measurement of the serrations on the side of the root remote from the abutments disposed vertically.

27. Apparatus as claimed in claim 22, wherein means is provided to lock said holding member in each of its positions in which a cam-plate is in an operational position.

28. Apparatus as claimed in claim 21, wherein said holding member supports said gauging pillar vertically, and said gauging pillar means further comprises a plurality of gauging pins, one for each of said ridges, supported vertically and above said gauging pillar with limited freedom of axial movement in a pin supporting member pivoted to said holding member about a vertical axis, the gauging pins being arranged so that they may have their long axes successively aligned with the axis of the gauging pillar by movement of the pin supporting member and so that they may contact the gauging pillar when it is moved axially to allow said cam-plate to be straddled over one of said ridges, the gauging pins differing successively in length by a standard pitch to which successive ridges of the straight series of serrations to be checked or measured should conform, and the top surface of each gauging pin being flat and normal to its long axis and forming a reference surface each containing a reference point which is fixed relatively to said gauging pillar when the pin is in contact with the pillar.

29. Apparatus as claimed in claim 28, wherein means is provided to lock said pin supporting member to said holding member in each of its positions in which a gauging pin is aligned with said gauging pillar.

30. Apparatus as claimed in claim 28, wherein said abutment means comprises a fixed abutment carried from said holding member and shaped and arranged to enter and engage the flanks of the serration on the root of a "fir-tree" root blade on one side of the root nearest the working portion of the blade, a second abutment slidable towards and away from the first abutment along a vertically disposed anvil surface, the second abutment being shaped and arranged to enter and engage the flanks of another serration on said one side of the root, and means to clamp the root of a "fir-tree" root blade against said abutments, the abutments positioning the blade with a reference line of pitch measurement of the serrations on the side of the root remote from the abutments disposed vertically.

31. Apparatus as claimed in claim 21 wherein said cam plate means comprises as many cam plates as there are ridges in a straight series of serrations, the pitch of which are to be measured or checked, in the root of a "fir tree" root blade, one of said peripheral contacting means is on each of said cam plates for engaging a ridge between adjacent serrations, said peripheral contacting means being spaced axially of the gauging pillar in correspondence with a standard spacing of the ridges, each said peripheral contacting means engaging a ridge when the "fir tree' root blade is located by said abutment means.

32. Apparatus for checking or measuring a straight series of two or more grooves or serrations as defined comprising support means; gauging pillar means journaled with rotational and axial freedom in said support means, abutment means separate of said gauging pillar means and carried by said support means, said abutment means comprising a fixed abutment shaped and arranged to enter and engage the flanks of the serration on the root of a "fir tree" blade root on one side of the root nearest the working portion of the blade, a second abutment, movable towards and away from the first-mentioned abutment, the second abutment being shaped and arranged to enter and engage the flanks of another serration on said one side of the root, and means to clamp the root of a "fir tree" root blade against said abutments, the abutments positioning the blade with a reference line of pitch measurements of the serrations on the side of the root remote from the abutments disposed parallel with the axis of the gauging pillar, cam plate means fixed on said gauging pillar means peripheral contacting means on said cam plate means for engaging at least one flank of said grooves or serrations to be checked or measured; means on said support means for moving said gauging pillar means and contacting means into operational position whereby by rotation of said gauging pillar means at least said one flank of each of said grooves or serrations is successively engaged by said peripheral contacting means when the article is located by said abutment means, and means on said support means operatively connected to said gauging pillar means for indicating changes in a dimension extending in the direction of axial freedom of the gauging pillar means between a point on the gauging pillar means and a point fixed relatively to said abutment means.

33. Apparatus as claimed in claim 1 wherein said serartions are V-shaped, gauging pillar means comprises a gauging pillar and said cam means and peripheral contacting means comprise a flange on said gauging pillar having a peripheral part of V-section profile with a rounded nose, the included angle of the V being less than that of the V-shaped serrations to be checked.

34. Apparatus as claimed in claim 1 wherein said cam plate means comprises two cam plates, each cam plate having a peripheral contacting means constructed and arranged so that it can straddle a ridge in a straight series of two or more serrations as defined on the root of a "fir tree" blade root located by said abutment means and said gauging pillar means also comprises a plurality of gauge pins, one of said pins being provided of a length differing from that of another of the gauge pins by an amount equal to the standard pitch between the ridge and another serration in the series.

References Cited in the file of this patent

UNITED STATES PATENTS

| | | |
|---|---|---|
| 1,281,805 | Metzger | Oct. 15, 1918 |
| 2,443,858 | Hughes | June 22, 1948 |
| 2,499,418 | Rinaldy | Mar. 7, 1950 |
| 2,583,936 | Fisk | Jan. 29, 1952 |
| 2,643,459 | Beevs | June 30, 1953 |
| 2,668,361 | Stalkhandske | Feb. 9, 1954 |
| 2,828,547 | Campbell | Apr. 1, 1958 |

FOREIGN PATENTS

| | | |
|---|---|---|
| 369,503 | Germany | Feb. 20, 1923 |
| 712,539 | England | July 28, 1954 |